United States Patent
Liu et al.

(10) Patent No.: US 11,087,636 B2
(45) Date of Patent: Aug. 10, 2021

(54) LIGHTS-GUIDED PIANO LEARNING AND TEACHING APPARATUS, AND METHOD

(71) Applicants: Xingxin Liu, Millbrae, CA (US); Bin Ye, Burlingame, CA (US); Yuezhang Wang, Burlingame, CA (US)

(72) Inventors: Xingxin Liu, Millbrae, CA (US); Bin Ye, Burlingame, CA (US); Yuezhang Wang, Burlingame, CA (US)

( * ) Notice: Subject to any disclaimer, the term of this patent is extended or adjusted under 35 U.S.C. 154(b) by 0 days.

(21) Appl. No.: 15/957,966

(22) Filed: Apr. 20, 2018

(65) Prior Publication Data
US 2019/0325776 A1 Oct. 24, 2019

(51) Int. Cl.
G09B 15/02 (2006.01)
G09B 15/00 (2006.01)
G10C 3/12 (2006.01)

(52) U.S. Cl.
CPC .......... *G09B 15/023* (2013.01); *G10C 3/12* (2013.01); *G09B 15/003* (2013.01)

(58) Field of Classification Search
CPC ....... G09B 15/023; G09B 15/003; G10C 3/12
USPC .......................................................... 84/478
See application file for complete search history.

(56) References Cited

U.S. PATENT DOCUMENTS

| | | | | |
|---|---|---|---|---|
| 2,505,608 A | * | 4/1950 | Edwards | G10G 1/02 84/470 R |
| 3,379,087 A | * | 4/1968 | Weitzner | G10G 3/04 84/478 |
| 3,693,493 A | * | 9/1972 | Schmoyer | G09B 15/08 84/479 R |
| 3,717,065 A | * | 2/1973 | Hebeisen | G10C 3/12 84/478 |
| 3,744,366 A | * | 7/1973 | Del Castillo | G09B 13/00 84/478 |

(Continued)

FOREIGN PATENT DOCUMENTS

| | | |
|---|---|---|
| CN | 202042072 U | 11/2011 |
| CN | 202736471 U | 2/2013 |
| JP | 2003150154 A | 5/2003 |

OTHER PUBLICATIONS

US Trademark Registration No. 86965796; Mark—The One Smart Piano Filing date: Apr. 6, 2016 Publication date: Jan. 24, 2017.

(Continued)

*Primary Examiner* — Christina M Schreiber
(74) *Attorney, Agent, or Firm* — Legalforce RAPC Worldwide (57) ABSTRACT

Disclosed are a method, a device and/or a system of a lights-guided piano key learning and teaching device. In one aspect, a piano teaching apparatus includes an elongated enclosure overlaid atop a portion of a set of keys of a piano and a set of lights, each light corresponding with each key of the set of keys respectively. A depth of an underside of the elongated enclosure permits the set of keys to be played in an unobstructed manner. The set of light illuminates when an application of a data processing system communicatively coupled with the piano teaching apparatus communicates a set of instructions synchronized with a musical note of a compilation displayed on the application of the data processing device. The musical note corresponds with a particular light that is directly above a particular key of the set of keys associated with the musical note.

20 Claims, 8 Drawing Sheets

OVERVIEW OF PIANO TEACHING APPARATUS
150B (56) References Cited

U.S. PATENT DOCUMENTS

| | | | | | |
|---|---|---|---|---|---|
| 3,958,487 | A | * | 5/1976 | Goldman | G09B 15/08 84/478 |
| 4,040,324 | A | * | 8/1977 | Green | G09B 15/08 84/478 |
| 4,061,072 | A | * | 12/1977 | del Castillo | G09B 15/08 84/478 |
| 4,516,465 | A | * | 5/1985 | Kani | G09B 15/08 84/470 R |
| 4,651,612 | A | * | 3/1987 | Matsumoto | G09B 15/08 84/470 R |
| 4,694,723 | A | * | 9/1987 | Shinohara | G09B 15/04 84/478 |
| 4,768,412 | A | * | 9/1988 | Sanderson | G10G 3/04 84/453 |
| 5,107,743 | A | * | 4/1992 | Decker | G09B 15/08 84/478 |
| 5,138,925 | A | * | 8/1992 | Koguchi | G10H 1/0016 84/478 |
| 5,392,682 | A | * | 2/1995 | McCartney-Hoy | G09B 15/003 84/470 R |
| 5,394,784 | A | * | 3/1995 | Pierce | G09B 15/003 84/464 A |
| 5,783,764 | A | * | 7/1998 | Amar | G09B 15/08 84/464 R |
| 5,907,115 | A | * | 5/1999 | Matsunaga | G09B 15/003 84/477 R |
| 6,037,534 | A | * | 3/2000 | Yasutoshi | G09B 15/04 84/423 R |
| 6,337,433 | B1 | * | 1/2002 | Nishimoto | A63J 17/00 84/464 A |
| 6,407,324 | B1 | * | 6/2002 | Hulcher | G09B 15/08 84/478 |
| 6,881,887 | B2 | * | 4/2005 | Berens | G09B 15/004 84/470 R |
| 7,227,069 | B1 | * | 6/2007 | Sanderson | G10C 3/12 400/708 |
| 7,390,958 | B2 | * | 6/2008 | Knudsen | G09B 15/023 84/464 A |
| 7,582,825 | B2 | * | 9/2009 | Chien | G09B 15/08 84/477 R |
| 8,525,011 | B2 | * | 9/2013 | Lhara | G09B 15/08 84/478 |
| 8,895,829 | B2 | * | 11/2014 | Soejima | G10H 1/0016 84/485 R |
| 8,901,405 | B1 | * | 12/2014 | McCarthy | G09B 15/023 84/478 |
| 9,082,313 | B1 | * | 7/2015 | McCarthy | G09B 15/023 |
| 9,099,065 | B2 | * | 8/2015 | Lillard | G10H 1/0016 |
| 9,640,087 | B2 | * | 5/2017 | Caldwell-Edmonds | G09B 15/026 |
| 9,836,992 | B2 | * | 12/2017 | McCarthy | G09B 15/003 |
| 2002/0134216 | A1 | * | 9/2002 | Shibukawa | G09B 15/026 84/477 R |
| 2002/0177113 | A1 | * | 11/2002 | Sherlock | G09B 15/08 434/308 |
| 2012/0297957 | A1 | * | 11/2012 | Lewison | G09B 15/006 84/478 |
| 2013/0068086 | A1 | * | 3/2013 | Mittelstadt | G09B 15/003 84/645 |
| 2015/0332601 | A1 | * | 11/2015 | Tamari | G09B 15/003 84/485 R |
| 2015/0364122 | A1 | * | 12/2015 | Ye | G10G 1/02 84/174 |
| 2019/0251936 | A1 | * | 8/2019 | Hiruma | G10H 1/0016 |
| 2019/0325776 | A1 | * | 10/2019 | Liu | G10G 1/02 |

OTHER PUBLICATIONS

"The One Piano Hi-Lite, Smart Piano learning device, Piano bar light strip", by The One Music Group, Published on Sep. 17, 2017 (pp. 14) https://www.smartpiano.com/prooucts/the-one-piano-hi-lite.

"Follow-me piano learning strip smartens up any 88-key piano", by Paul Ridden, Published on Sep. 20, 2017 (pp. 4) https://newatlas.com/one-piano-hi-lite-led-learning-strip/51421/.

* cited by examiner

| USER NAME 502 | PIANO TUTORIAL 504 | EXERCISE NO. 506 | ITERATIONS 508 | ERRORS WHILE PLAYING MUSICAL NOTATIONS 510 | USER PERFORMANCE SCORE 512 |
|---|---|---|---|---|---|
| Alicia Ray | Kids Plan | 4 | 3 | 12 | 6 |
| Joseph Roe | Beginner | 2 | 5 | 7 | 5 |
| Lisa White | Student | 3 | 2 | 5 | 8 |
| ------ | ------ | ------ | ------ | ------ | ------ |
| ------ | ------ | ------ | ------ | ------ | ------ |

TABLE VIEW 550

Fig. 5

LIGHTS-GUIDED PIANO LEARNING AND TEACHING APPARATUS, AND METHOD

FIELD OF TECHNOLOGY

This disclosure relates generally to piano learning and teaching apparatus and, more particularly, to a lights-guided piano learning and teaching apparatus, and method.

BACKGROUND

A piano is a popular musical instrument which is found throughout the United States in millions of homes and businesses. However, a few can play the piano well. The piano is difficult to master because learning the piano is a process that involves detailed hand, foot, ear and eye coordination. The piano is a polyphonic instrument. This means that the piano can play many notes at once, thus increasing the complexity of learning how to play it efficiently.

One key aspect of learning to play the piano is knowing which hand is to play which keys. This concept is known as "fingering". Specifically, the complexities of polyphonic notes make it sometimes confusing to know which finger is to play which key through a fingering technique. Sometimes, fingering that seems obvious isn't always the most sensible. Often a player does not realize this until their flawed technique makes it difficult to play a song at its proper tempo.

To make matters worse, changing fingering later is rather difficult. Why? Because hand muscles have learned to play notes a specific way, and these techniques must be unlearned. The only way out is to start again from scratch with new fingering training and do all practice steps again. This is often costly in terms of time, frustration, and wasted effort.

SUMMARY

Disclosed are a method, a device and/or a system of a lights-guided piano key learning and teaching apparatus.

In one aspect, a piano teaching apparatus includes an elongated enclosure with a set of lights overlaid atop a set of keys of a piano, each light corresponding to each key of of the set of keys respectively. The set of lights is directly atop each key of the set of keys. An underside of the teaching apparatus permits the set of keys to be played in an unobstructed manner.

A light illuminates when an application of a data processing device communicatively coupled with the piano teaching apparatus communicates a set of instructions synchronized with a musical note of a compilation displayed on the application of the data processing device to trigger the light. The musical note corresponds with a particular light that is directly above a particular key of the set of keys associated with the musical note.

Feature of the lights include blue and red LED lights and advanced laser sensor technology that synchronize with the program's lesson and/or game, correlating the light color and change speed depending on skill level. Additionally, auto-correction enables the LED lights to pause until the correct key is pressed. The application of the data processing system may enable a microphone of the data processing system to listen to an audio resonated when a user of the piano plays any key of the set of keys. The application of the data processing system may determine if the audio is associated with the musical note.

The piano teaching apparatus may advance to a next musical note of the compilation on the display when the key pressed by a user is associated with the musical note. The data processing device may persist on the musical note of the compilation on the display when the audio sensed by the data processing device is not associated with the musical note.

The application may provide the user with analytics including how many musical notes the user was successfully able to play on a first attempt while the compilation progresses in sequence. The lights may be light emitting diodes which display in binary colors of blue and red. The application of the data processing device may communicate which of the binary colors to illuminate based on which human hand is to be used to play the musical note.

The piano teaching apparatus may be wirelessly coupled with the data processing device through a Bluetooth connection. The data processing device may be a mobile phone and/or a tablet device.

The elongated enclosure may mechanically compress and/or expand in a telescopic manner when it is aligned to the piano by the user. The elongated enclosure may extend and/or contract based on a width of the piano and/or its corresponding set of keys. The elongated enclosure may calibrate with the application of the data processing device when it is initialized to ensure that the set of lights illuminates corresponding to each musical note. Each musical note may be associated with each one of the set of keys that directly underlies each light.

In another aspect, a system includes a lights-guided piano key electromechanical assembly having a base to enable the lights-guided piano key electromechanical assembly to situate onto a portion of a set of keys of a piano proximate to an inner edge of a piano keyboard. The system further includes an array of lights at the base of the lights-guided piano key electromechanical assembly corresponding with each key of the set of keys. The base of the lights-guided piano key electromechanical assembly has an array of wedge shaped underpins. In addition, the system includes a set of sensors at the array of wedge shaped underpins corresponding to each of the array of lights to identify playing of a particular key of the set of keys.

The array of wedge shaped underpins mechanically compresses and/or expands in an adjustable length telescopic manner when it is aligned to the piano by the user. Each of the wedge shaped underpin extends and/or contracts based on the width of the piano and/or its corresponding set of keys.

The array of wedge shaped underpins allows placing of the lights-guided piano key electromechanical assembly onto the set of keys of the piano and/or enables the set of keys to be played in an unobstructed manner. The array of lights corresponding with each key of the set of keys lights up when an application of a data processing system communicatively coupled with the lights-guided piano key electromechanical assembly communicates a set of instructions synchronized with a musical note of a compilation displayed on the application of the data processing system. The musical note corresponds with a particular light that is directly above a particular key of the set of keys associated with the musical note.

The set of sensors at the array of wedge shaped underpin identifies playing of the particular key of the set of keys based on the movement of the particular key associated with lighting up of the particular light associated with the musical note in real-time.

The application of the data processing system may enable a microphone of the data processing system to listen to an audio resonated when the user of the piano plays any key of the set of keys. The application of the data processing system may determine if the audio is associated with the musical note in real-time. The application may advance to a next musical note of the compilation on the display when the audio is associated with the musical note. The application may persist on the musical note of the compilation on the display when the audio is not associated with the musical note.

The application may provide the user with analytics including how many musical notes the user was successfully able to play on a first attempt while the compilation progresses in sequence.

The lights may be light emitting diodes which display in binary colors of blue and red. The application of the data processing system may communicate which of the binary colors to illuminate based on which human hand is to be used to play the musical note.

The application of the data processing system may enable the user to play the musical note interactively with the application of the data processing system to receive a real-time feedback.

The system may automatically calibrate with the application of the data processing system when it is initialized to ensure that the set of lights illuminate corresponding to each musical note associated with each one of the set of keys that directly underlies each light. The system may enable the user to play an LED-guided sheet-music.

A blue illumination of a particular light of the array of lights may indicate a left hand note and/or a red illumination of the particular light of the array of lights may indicate a right hand note to play the musical note.

In yet another aspect, a method of a piano teaching apparatus includes overlaying a lights-guided enclosure panel above a portion of a set of keys of a piano adjacent to an inner edge of a piano keyboard. The method further includes aligning an elongated underpin below each key of the set of keys at an underside of the lights-guided enclosure panel and synchronizing a set of lights of the lights-guided enclosure panel with each key of the set of keys. In addition, the method includes communicatively coupling an application of a data processing system with the piano teaching apparatus, illuminating up a particular light directly above a particular key of the set of keys associated with a musical note, and placing an array of sensors to the underside of each of the elongated underpin of the lights-guided enclosure panel.

The underside of the lights-guided enclosure panel permits the set of keys to be played in an unobstructed manner. The elongated underpin mechanically compresses and/or expands in an adjustable length telescopic manner such that the elongated underpin extends and/or contracts based on a width of the piano and/or its corresponding set of keys.

The set of lights of the lights-guided enclosure panel is directly above each key of the set of keys on the piano teaching apparatus. The application of a data processing system communicates a set of instructions synchronized with the musical note of a compilation displayed on the application of the data processing system. The musical note corresponds with a particular light that is directly above a particular key of the set of keys associated with the musical note.

The particular light directly above the particular key of the set of keys is associated with the musical note of the compilation displayed on the application of the data processing system. The array of sensors identifies playing of a particular key of the set of keys based on the movement of the particular key associated with lighting up of the particular light associated with the musical note in real-time.

The method of the piano teaching apparatus may include listening through a microphone of the data processing system to an audio resonated when the user of the piano plays any key of the set of keys. In addition, the method may include determining if the audio is associated with the musical note, advancing to a next musical note of the compilation on the display when the audio is associated with the musical note, and/or pausing the musical note of the compilation on the display when the audio is not associated with the musical note.

Further, the method may include displaying the particular light directly above the particular key of the set of keys associated with the musical note of the compilation in binary colors of blue and red. The application of the data processing system may communicate which of the binary colors to illuminate based on which human hand is to be used to play the musical note.

Furthermore, the method includes providing the user with analytics in real-time including how many musical notes the user was successfully able to play on a first attempt while the compilation progresses in sequence.

Additionally, the method includes calibrating the piano teaching apparatus with the application of the data processing system. The method may initialize the piano teaching apparatus to ensure that the set of lights illuminated correspond to each musical note associated with each one of the set of keys that directly underlies each light.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or a apparatus of a lights-guided piano key learning and teaching assembly.

In one embodiment, a piano teaching apparatus 102 includes an elongated enclosure (e.g., elongated underpins 204) with a set of lights 108 overlaid atop a portion (e.g., inner edge 126) of a set of keys 104 of a piano 106, each light corresponding to each key of the set of keys 104. The set of lights 108 is directly atop each key of the set of keys 104. An underside of the piano teaching apparatus 102 (e.g., using elongated underpins 204) permits the set of keys 104 to be played in an unobstructed manner.

A light of the set of lights 108 illuminates when an application (e.g., piano teaching application 308) of a data processing device 110 communicatively coupled with the piano teaching apparatus 102 communicates a set of instructions 112 synchronized with a musical note 116 of a compilation 114 displayed on the application (e.g., piano teaching application 308) of the data processing device 110 to trigger the light. The musical note 116 corresponds with a particular light 118 that is directly above a particular key 120 of the set of keys 104 associated with the musical note 116.

Feature of the lights include blue and red LED lights (e.g., set of lights 108) and advanced laser sensor technology (e.g., using array of laser sensors 208) that synchronize with the program's lesson and/or game, correlating the light color and change speed depending on user's skill level. Additionally, auto-correction enables the LED lights to pause until the correct key is pressed. The application (e.g., piano teaching application 308) of the data processing device 110 may enable a microphone 124 of the data processing device 110 to listen to an audio resonated (e.g., captured audio data 312) when a user 122 of the piano 106 plays any key of the set of keys 104. The application (e.g., piano teaching application 308) of the data processing system (e.g., data processing device 110) may determine if the audio (e.g., captured audio data 312) is associated with the musical note 116.

The piano teaching apparatus 102 may advance to a next musical note 116 of the compilation 114 on the display when the key pressed by a user 122 is associated with the musical note 116 (e.g., using captured audio data 312). The data processing device 110 may persist on the musical note 116 of the compilation 114 on the display when the audio sensed by the data processing device 110 is not associated with the musical note 116.

The application (e.g., piano teaching application 308) may provide the user 122 with analytics (e.g., analytical data 314) including how many musical notes 116 the user 122 was successfully able to play on a first attempt while the compilation 114 progresses in sequence. The lights (e.g., particular light 118) may be light emitting diodes which display in binary colors of blue and red. The application (e.g., piano teaching application 308) of the data processing system (data processing device 110) may communicate which of the binary colors to illuminate based on which human hand (e.g., left or right) is to be used to play the musical note 116.

The piano teaching apparatus 102 may be wirelessly coupled with the data processing device 110 through a Bluetooth connection. The data processing device 110 may be a mobile phone and/or a tablet device.

The elongated enclosure (e.g., elongated underpins 204) may mechanically compress and/or expand in the telescopic manner when it is aligned to the piano 106 by the user 122. The elongated enclosure (e.g., elongated underpins 204) may extend and/or contract based on a width of the piano 106 and/or its corresponding set of keys 104. The elongated enclosure (e.g., elongated underpins 204) may calibrate with the application (e.g., piano teaching application 308) of the data processing device 110 when it is initialized to ensure that the set of lights 108 illuminates corresponding to each musical note 116. Each musical note 116 may be associated with each one of the set of keys 104 that directly underlies each light.

In another embodiment, a system includes a lights-guided piano key electromechanical assembly (e.g., piano teaching apparatus 102) having a base to enable the lights-guided piano key electromechanical assembly (e.g., piano teaching apparatus 102) to situate onto a portion (e.g., inner edge 126) of a set of keys 104 of a piano 106 proximate to an inner edge 126 of a piano keyboard. The system further includes an array of lights (e.g., set of lights 108) at the base of the lights-guided piano key electromechanical assembly (e.g., piano teaching apparatus 102) corresponding with each key of the set of keys 104. The base of the lights-guided piano key electromechanical assembly (e.g., piano teaching apparatus 102) has an array of wedge shaped underpins (e.g., elongated underpins 204). In addition, the system includes a set of sensors (e.g., array of laser sensors 208) at the array of wedge shaped underpins (e.g., elongated underpins 204) corresponding to each of the array of lights (e.g., set of lights 108) to identify playing of a particular key 120 of the set of keys 104.

The array of wedge shaped underpins (e.g., elongated underpins 204) mechanically compresses and/or expands in an adjustable length telescopic manner when it is aligned to the piano 106 by the user 122. Each of the wedge shaped underpin (e.g., elongated underpins 204) extends and/or contracts based on a width of the piano 106 and/or its corresponding set of keys 104.

The array of wedge shaped underpins (e.g., elongated underpins 204) allows placing of the lights-guided piano key electromechanical assembly (e.g., piano teaching apparatus 102) onto the set of keys 104 of the piano 106 and/or enables the set of keys 104 to be played in an unobstructed manner. The array of lights (e.g., set of lights 108) corresponding with each key of the set of keys 104 lights up when an application (e.g., piano teaching application 308) of a data processing system (e.g., data processing device 110) communicatively coupled with the lights-guided piano key electromechanical assembly (e.g., piano teaching apparatus 102) communicates a set of instructions 112 synchronized with a musical note 116 of a compilation 114 displayed on the application (e.g., piano teaching application 308) of the data processing system (e.g., data processing device 110). The musical note 116 corresponds with a particular light 118 that is directly above a particular key 120 of the set of keys 104 associated with the musical note 116.

The set of sensors (e.g., array of laser sensors 208) at the array of wedge shaped underpin (e.g., elongated underpins 204) identifies playing of the particular key 120 of the set of keys 104 based on the movement of the particular key 120 associated with lighting up of the particular light 118 associated with the musical note 116 in real-time.

The application (e.g., piano teaching application 308) of the data processing device 110 may enable a microphone 124 of the data processing system (e.g., data processing device 110) to listen to an audio resonated (e.g., captured audio data 312) when the user 122 of the piano 106 plays any key of the set of keys 104. The application (e.g., piano teaching application 308) of the data processing system (e.g., data processing device 110) may determine if the audio (e.g., captured audio data 312) is associated with the musical note 116 in real-time. The application (e.g., piano teaching application 308) may advance to a next musical note 116 of the compilation 114 on the display when the audio is associated with the musical note 116. The application (e.g., piano teaching application 308) may persist on the musical note 116 of the compilation 114 on the display when the audio (e.g., captured audio data 312) is not associated with the musical note 116.

The application (e.g., piano teaching application 308) may provide the user 122 with analytics (e.g., analytical data 314 using musical note algorithm 316 of the piano teaching server 300) including how many musical notes 116 the user 122 was successfully able to play on a first attempt while the compilation 114 progresses in sequence.

The lights may be light emitting diodes which display in binary colors of blue and red. The application (e.g., piano teaching application 308) of the data processing device 110 may communicate which of the binary colors to illuminate based on which human hand is to be used to play the musical note 116.

The application (e.g., piano teaching application 308) of the data processing system (e.g., data processing device 110) may enable the user 122 to play the musical note 116 interactively with the application (e.g., piano teaching application 308) of the data processing system (e.g., data processing device 110) to receive a real-time feedback.

The system may automatically calibrate with the application (e.g., piano teaching application 308) of the data processing system (e.g., data processing device 110) when it is initialized to ensure that the set of lights 108 illuminate corresponding to each musical note 116 associated with each one of the set of keys 104 that directly underlies each light. The system may enable the user 122 to play an LED-guided sheet-music.

A blue illumination of a particular light 118 of the array of lights may indicate a left hand note and/or a red illumination of the particular light 118 of the array of lights (e.g., set of lights 108) may indicate a right hand note to play the musical note 116.

In yet another embodiment, a method of a piano teaching apparatus 102 includes overlaying a lights-guided enclosure panel 202 above a portion (e.g., inner edge 126) of a set of keys 104 of a piano 106 adjacent to an inner edge 126 of a piano 106 keyboard. The method further includes aligning an elongated underpin 204 below each key of the set of keys 104 at an underside of the lights-guided enclosure panel 202 and synchronizing a set of lights 108 of the lights-guided enclosure panel 202 with each key of the set of keys 104. In addition, the method includes communicatively coupling an application (e.g., piano teaching application 308) of a data processing system (e.g., data processing device 110) with the piano teaching apparatus 102, illuminating up a particular light 118 directly above a particular key 120 of the set of keys 104 associated with a musical note 116, and placing an array of sensors to the underside of each of the elongated underpin 204 of the lights-guided enclosure panel 202.

The underside of the lights-guided enclosure panel 202 permits the set of keys 104 to be played in an unobstructed manner. The elongated underpin mechanically compresses and/or expands in an adjustable length telescopic manner such that the elongated underpin extends and/or contracts based on a width of the piano 106 and/or its corresponding set of keys 104.

The set of lights 108 of the lights-guided enclosure panel 202 is directly above each key of the set of keys 104 on the piano teaching apparatus 102. The application (e.g., piano teaching application 308) of a data processing system (e.g., data processing device 110) communicates a set of instructions 112 synchronized with the musical note 116 of a compilation 114 displayed on the application (e.g., piano teaching application 308) of the data processing system (e.g., data processing device 110). The musical note 116 corresponds with a particular light 118 that is directly above a particular key 120 of the set of keys 104 associated with the musical note 116.

The particular light 118 directly above the particular key 120 of the set of keys 104 is associated with the musical note 116 of the compilation 114 displayed on the application (e.g., piano teaching application 308) of the data processing system (e.g., data processing device 110). The array of sensors (e.g., array of laser sensors 208) identifies playing of a particular key 120 of the set of keys 104 based on the movement of the particular key 120 associated with lighting up of the particular light 118 associated with the musical note 116 in real-time.

The method of the piano teaching apparatus 102 may include listening through a microphone 124 of the data processing system (e.g., data processing device 110) to an audio resonated when the user 122 of the piano 106 plays any key of the set of keys 104. In addition, the method may include determining if the audio is associated with the musical note 116, advancing to a next musical note 116 of the compilation 114 on the display when the audio is associated with the musical note 116, and/or pausing the musical note 116 of the compilation 114 on the display when the audio is not associated with the musical note 116.

Further, the method may include displaying the particular light 118 directly above the particular key 120 of the set of keys 104 associated with the musical note 116 of the compilation 114 in binary colors of blue and red. The application (e.g., piano teaching application 308) of the data processing system (e.g., data processing device 110) may communicate which of the binary colors to illuminate based on which human hand is to be used to play the musical note 116.

Furthermore, the method includes providing the user 122 with analytics in real-time including how many musical notes 116 the user 122 was successfully able to play on a first attempt while the compilation 114 progresses in sequence.

Additionally, the method includes calibrating the piano teaching apparatus 102 with the application (e.g., piano teaching application 308) of the data processing system (e.g., data processing device 110). The method may initialize the piano teaching apparatus 102 to ensure that the set of lights 108 illuminated correspond to each musical note 116 associated with each one of the set of keys 104 that directly underlies each light.

Figure 1A:
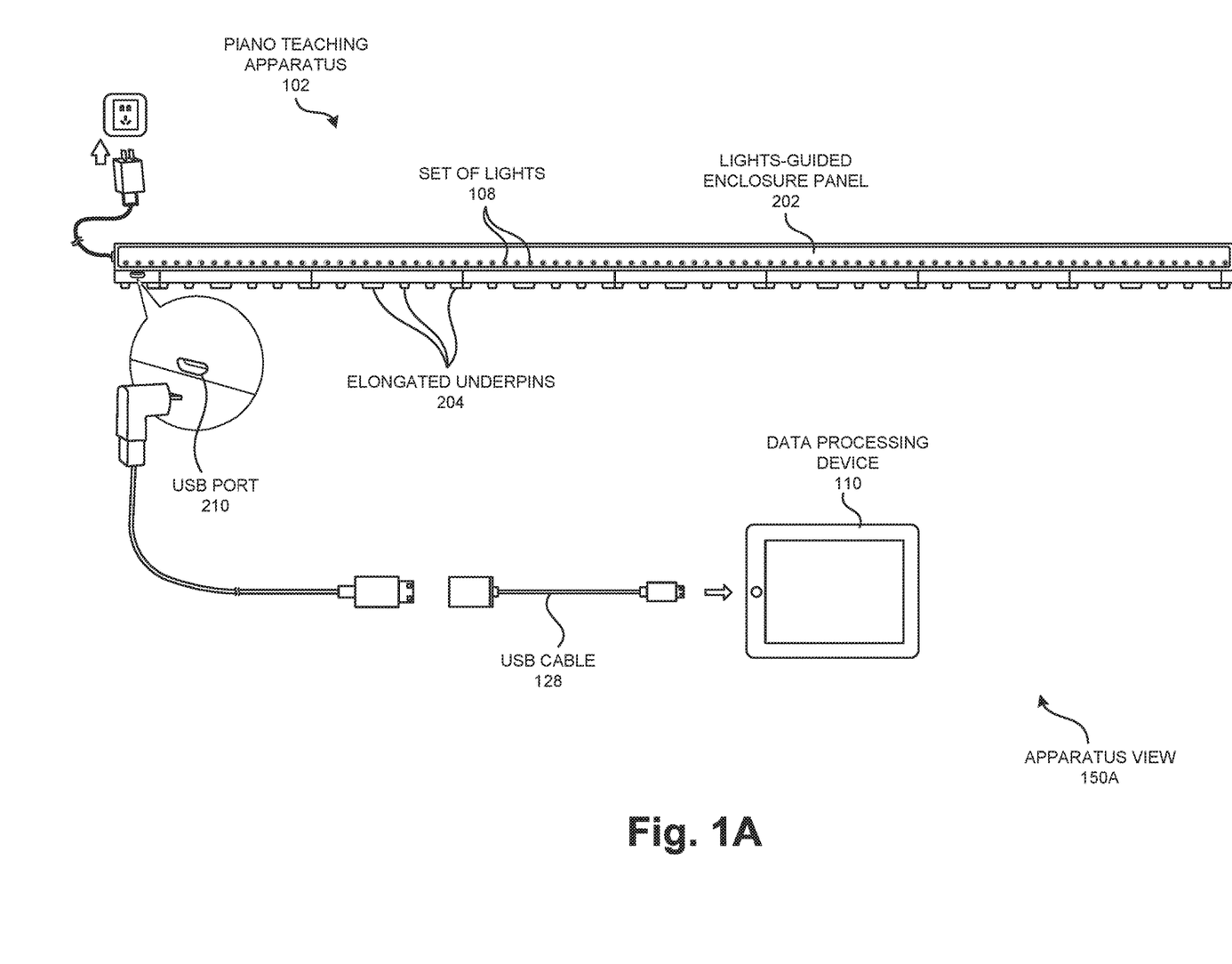
FIG. 1A is an apparatus view of a piano teaching apparatus illustrating the components of the piano teaching apparatus, according to one embodiment.

FIG. 1A is an apparatus view 150A of a piano teaching apparatus 102 illustrating the constituent components of the piano teaching apparatus 102, according to one embodiment. Particularly, FIG. 1A illustrates the piano teaching apparatus 102, a set of lights 108, a data processing device 110, a lights-guided enclosure panel 202, an elongated underpins 204, a USB cable 128, and a USB port 210, according to one embodiment.

The piano teaching apparatus 102 may be an electromechanical device that may be situated atop a set of keys 104 of a piano 106 to help educate the user 122 to learn playing the musical instrument when communicatively coupled with a data processing device 110 (e.g., a tablet, mobile device, etc.). The set of lights 108 may be a group of lamps in the lights-guided enclosure panel 202 of the piano teaching apparatus 102 which may illuminate based on the set of instructions 112 synchronized with the musical note 116 of the compilation 114 when the data processing device 110 is communicatively coupled with the piano teaching apparatus 102, according to one embodiment.

The data processing device 110 may be a computer program to record, analyze, sort, summarize, calculate disseminate, and store a set of input data (e.g., compilation 114) to produce a defined set of output (e.g., set of instructions 112 synchronized with the musical note 116 of the compilation 114). The data processing device 110 may be communicatively coupled to the piano teaching apparatus 102 situated at the top of set of keys 104 of a piano 106 through a USB cable 128 when playing the piano 106, according to one embodiment.

The lights-guided enclosure panel 202 may be a closed flat board of the piano teaching apparatus 102 containing a plurality of LED lights (e.g., set of lights 108) to illuminate based on the set of instructions 112 synchronized with the musical note 116 of the compilation 114. The color of illumination of the particular light 118 in the lights-guided enclosure panel 202 may indicate the particular hand (e.g., left or right hand) to be used to play the particular key 120 of the set of keys 104, according to one embodiment.

The elongated underpins 204 may be a plurality of trapezoidal shaped members corresponding to each key of the set of keys 104 that may mechanically extend and/or contract based on the particular key 120 played by the user 122 when it is aligned to the piano 106 by the user 122, according to one embodiment.

The USB cable 128 may be an insulated cord with universal serial bus which may be used for transmitting electricity and/or telecommunication signals from the data processing device 110 to the piano teaching apparatus 102. The USB port 210 may be a standard cable connection interface for the data processing device 110 and the piano teaching apparatus 102, according to one embodiment.

Figure 1B:
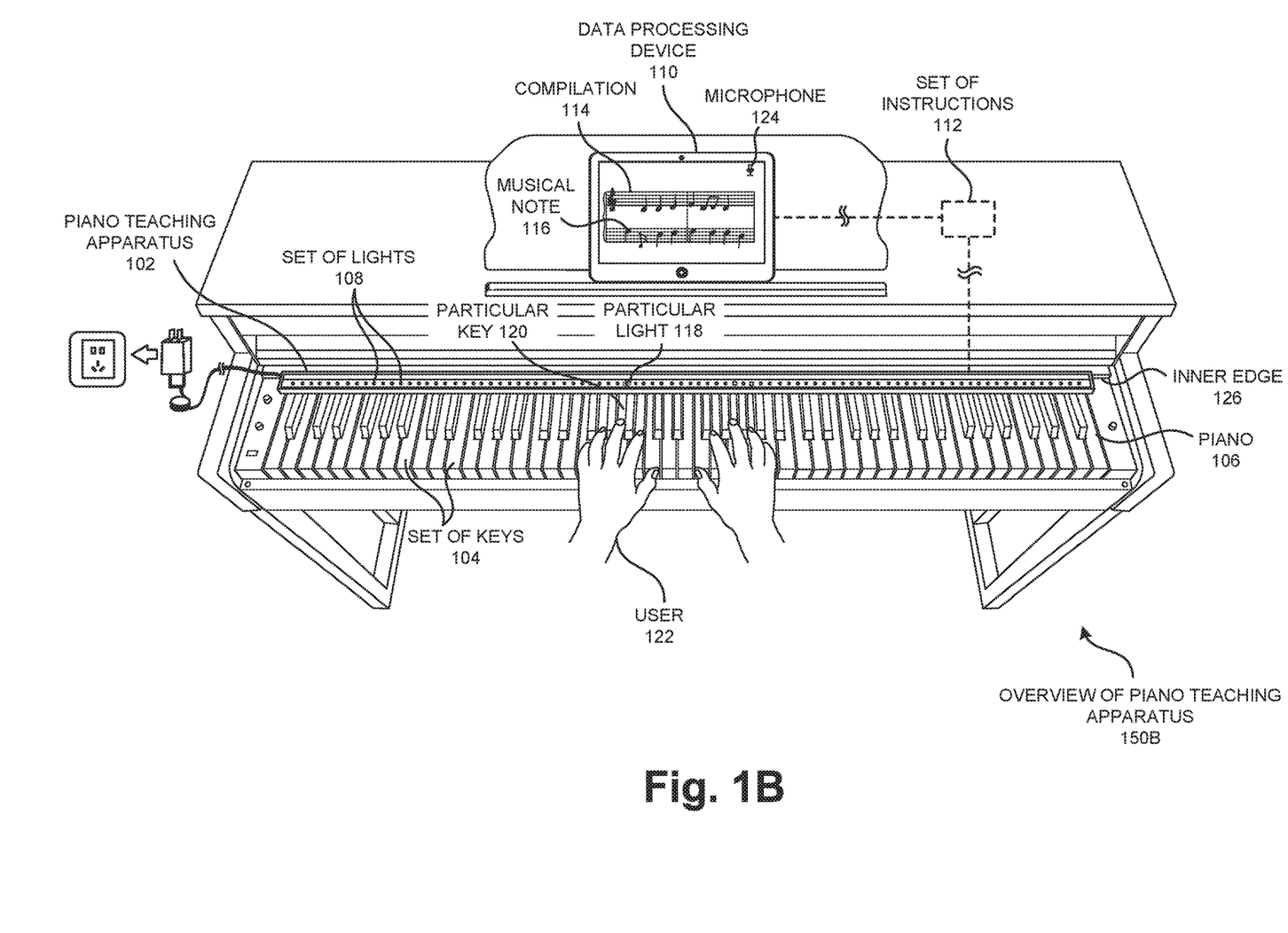
FIG. 1B is an overview of the piano teaching apparatus of FIG. 1A illustrating the piano teaching apparatus overlaid atop an inner edge of a piano and communicatively coupled with a data processing device to communicate a set of instructions synchronized with a musical note of a compilation, according to one or more embodiments.

FIG. 1B is an overview of the piano teaching apparatus 150B illustrating the piano teaching apparatus 102 overlaid atop an inner edge 126 of a piano 106 and communicatively coupled with the data processing device 110 to communicate a set of instructions 112 synchronized with a musical note 116 of a compilation 114, according to one embodiment. Particularly, FIG. 1B builds on FIG. 1A, and further adds, the piano teaching apparatus 102, a set of keys 104, the piano 106, a set of lights 108, data processing device 110, the set of instructions 112, the compilation 114, the musical note 116, the particular light 118, the particular key 120, the user 122, a microphone 124, and an inner edge 126, according to one embodiment.

The piano teaching apparatus 102 may be an electromechanical device that may be situated atop the set of keys 104 of the piano 106 to help educate the user 122 to learn playing the musical instrument when communicatively coupled to a data processing device 110 (e.g., a tablet, a mobile device, a laptop, etc.), according to one embodiment.

The set of keys 104 may be a group of levers that may be pressed down and/or struck with the fingers and thumbs of both hands by the user 122 to cause the hammers of the piano 106 to strike the strings to play a musical note 116, according to one embodiment.

The piano 106 may be an acoustic stringed instrument in which the strings are struck by the hammers when played using a keyboard to produce a musical sound. The piano teaching apparatus 102 may be placed over the keyboard of the piano 106 when playing the instrument, according to one embodiment.

The set of instructions 112 may be a set of machine readable instructions that direct the processor of the data processing device 110 to perform specific operations. The piano teaching application 308 of the data processing device 110 may communicate the set of instructions 112 synchronized with the musical note 116 of the compilation 114 to illuminate the particular light 118 directly above the particular key 120 which may be associated with the musical note 116, according to one embodiment.

The compilation 114 may be a collection of music tracks, either previously released and/or unreleased, usually from several separate recordings. The musical note 116 may be the pitch and duration of a sound, and also its representation in musical notation, according to one embodiment.

The particular light 118 may be a specific lamp (e.g., LED light) of the set of lights 108 associated with a particular key 120 of the set of keys 104 that may illuminate based on the set of instructions 112 synchronized with the musical note 116 of the compilation 114. The color of illumination of the particular light 118 in the lights-guided enclosure panel 202 may indicate the particular hand (e.g., left or right hand) to be used to play the particular key 120 of the set of keys 104. A BLUE color of illumination of the particular light 118 in the lights-guided enclosure panel 202 may indicate a LEFT hand note while a RED color of illumination of the particular light 118 in the lights-guided enclosure panel 202 may indicate a RIGHT hand note, according to one embodiment.

The particular key 120 may be a specific key of the set of keys 104 associated with the particular light 118 of the set of lights 108. The user 122 may be the person using the piano teaching apparatus 102 that is communicatively coupled with the data processing device 110, according to one embodiment.

The microphone 124 may be a transducer that converts sound into an electrical signal. The microphone 124 of the data processing device 110 may convert sound waves produced by playing the set of keys 104 of the piano 106 into analogous electrical waves. The inner edge 126 may be an internal boundary of the piano keyboard where the piano teaching apparatus 102 may be placed, according to one embodiment.

Figure 2A:
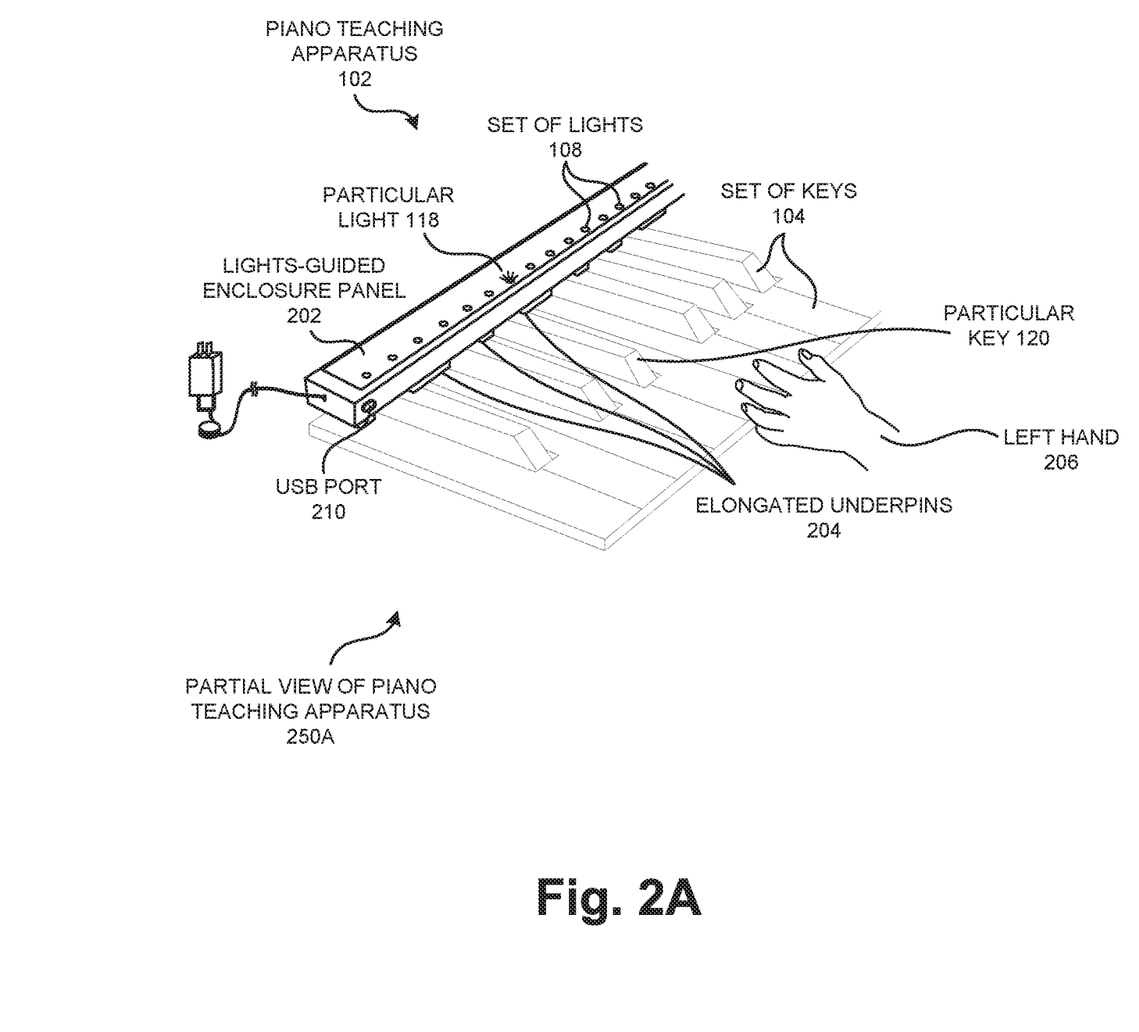
FIG. 2A is a partial view of the piano teaching apparatus of FIG. 1A-B illustrating the overlaying of piano teaching apparatus atop a set of keys of the piano, according to one or more embodiments.

FIG. 2A is a partial view 250A of the piano teaching apparatus 102 of FIG. 1A-B illustrating the overlaying of the piano teaching apparatus 102 atop a set of keys 104 of the piano 106, according to one embodiment. Particularly, FIG. 2A builds on FIGS. 1A-B, and further illustrates positioning of the elongated underpin 204 of the piano teaching apparatus 102 directly above the set of keys 104 of the piano 106. Once calibrated with the application of the data processing device 110, the particular light 118 may illuminate based on the set of instructions 112 synchronized with the musical note 116 of the compilation 114 indicating the user 122 to play (e.g., through left hand 206) the particular key 120 associated with the particular light 118, according to one embodiment.

The array of laser sensor 208 may be an ordered series of devices that can detect motion of the elongated underpin 204 associated with a particular key 120 of the set of keys 104 of the piano 106 when played by the user 122. The array of laser sensor 208 may use a laser beam to determine the movement (e.g., expansion and/or contraction) of the elongated underpin 204 associated with the particular key 120 of the piano 106 when it is pressed. In addition, the array of laser sensor 208 may detect the duration for which the elongated underpins 204 contracts and/or expand, according to one embodiment.

The array of laser sensor 208 may be placed inside the cavity of the elongated underpin 204 to detect motion of the particular key 120 of the set of keys 104 of the piano 106 when played by the user 122. Further, array of laser sensor 208 may identify playing of a particular key 120 of the set of keys 104 based on the movement of the particular key 120 associated with lighting up of the particular light 118 associated with the musical note 116 in real-time, according to one embodiment.

Figure 2B:
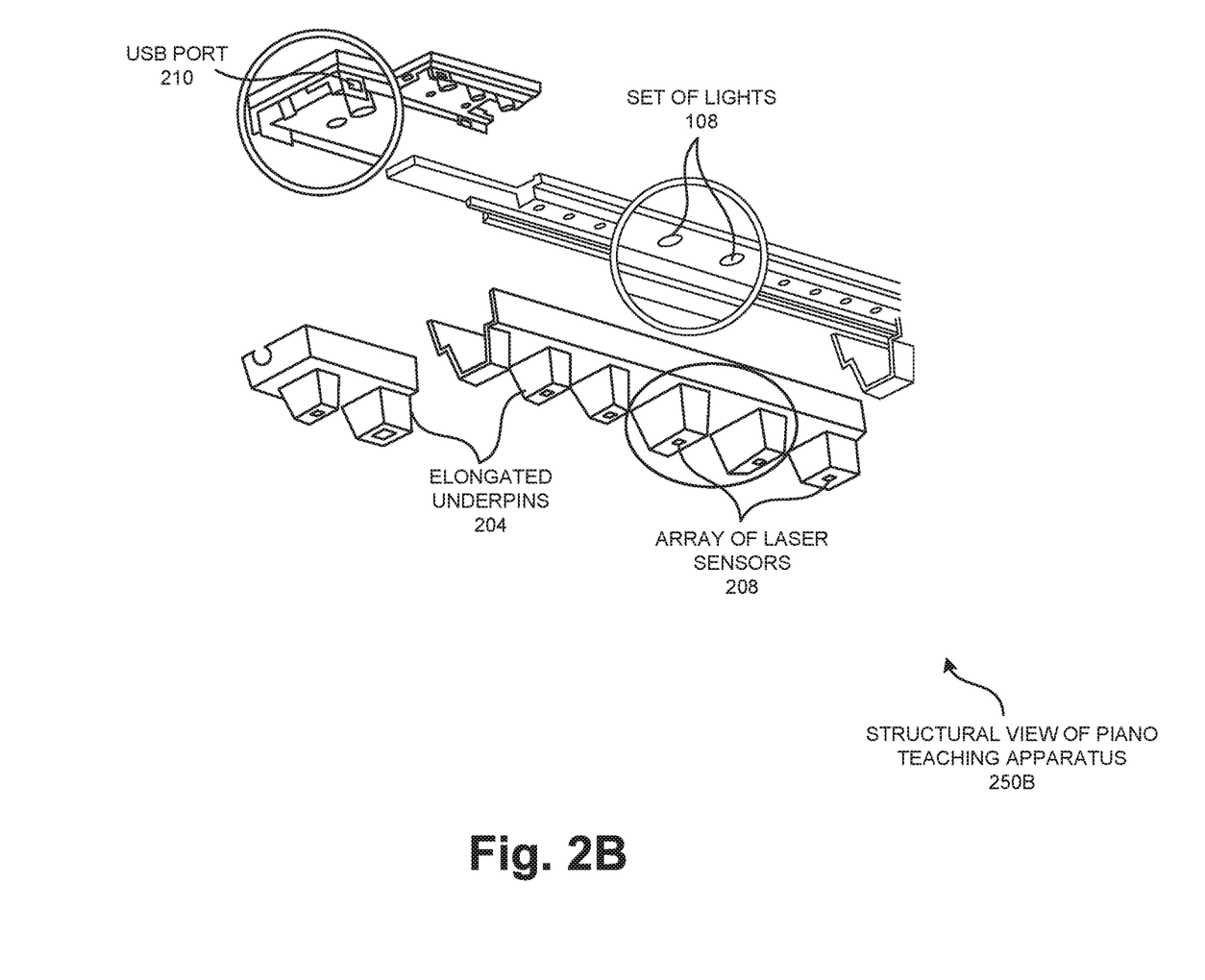
FIG. 2B is a structural view of the piano teaching apparatus of FIG. 1A-B illustrating an array of laser sensors situated inside the elongated underpins at the bottom of the piano teaching apparatus, according to one or more embodiments.

FIG. 2B is a structural view 250B of the piano teaching apparatus 102 of FIG. 1 illustrating the inside of the piano teaching apparatus 102, according to one embodiment. Particularly, FIG. 2B builds on FIGS. 1A-B, and FIG. 2A, and further illustrates positioning of the array of laser sensor 208 placed inside the cavity of the elongated underpin(s) 204. The array of laser sensor 208 may detect the motion of the elongated underpin(s) 204 situated directly above the particular key 120 of the set of keys 104 of the piano 106 when played by the user 122. The array of laser sensor 208 may detect the mechanical compression and/or expansion of the elongated underpin(s) 204 directly underneath the particular key 120 when the user 122 plays it, according to one embodiment.

Figure 3:
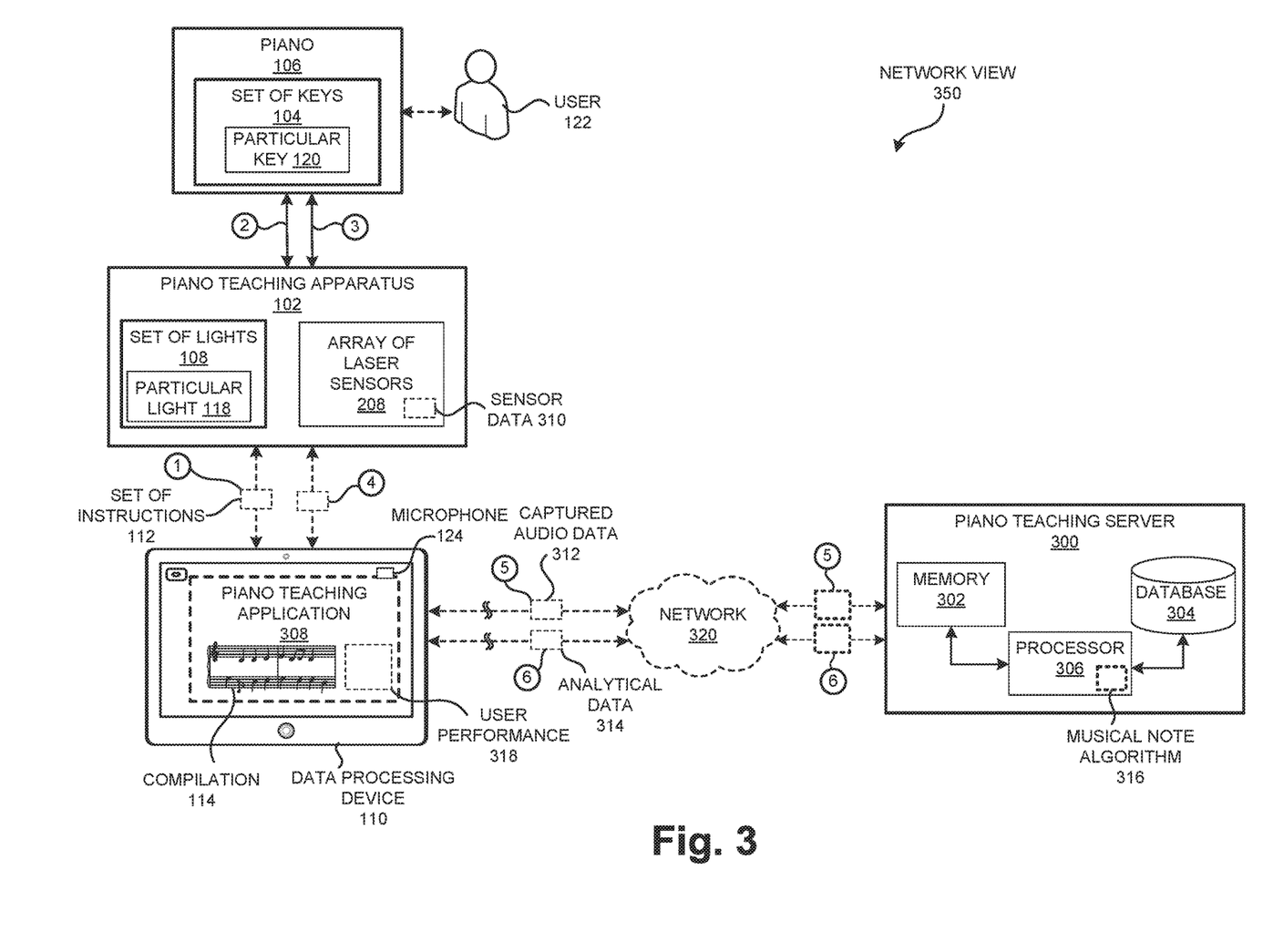
FIG. 3 is a network view of piano teaching server receiving a captured audio data from a microphone of a data processing device communicatively coupled with the piano teaching apparatus of FIG. 1A-B and communicating a real-time analytical data based on user's performance while playing the piano using the piano teaching apparatus, according to one or more embodiments.

FIG. 3 is a network view 350 of piano teaching server 300 receiving a captured audio data 312 from a microphone 124 of a data processing device 110 communicatively coupled with the piano teaching apparatus 102 of FIG. 1A-B and communicating a real-time analytical data 314 based on user's performance 318 while playing the piano 106 using the piano teaching apparatus 102, according to one embodiment. Particularly, FIG. 3 builds on FIGS. 1, 2A and 2B, and further adds, a piano teaching server 300, a memory 302, a database 304, a processor 306, a piano teaching application 308, a sensor data 310, a captured audio data 312, an analytical data 314, a musical note algorithm 316, the user performance 318, and a network 320, according to one embodiment.

The piano teaching server 300 may be a computer program designed to process requests of specialized applications (e.g., music compilations, piano teaching application 308, etc.) and deliver data (e.g., analytical data 314) to other (client) computers (e.g., data processing device 110) and/or its user(s) 122 over a local network 320 and/or the Internet. The memory 302 may be an electronic holding place for instructions and data that microprocessor of the piano teaching server 300 can reach quickly, according to one embodiment.

The database 304 may be a collection of information organized in such a way that a computer program (e.g., processor 306) can quickly access, select, manage, and update desired pieces of data. The processor 306 may be a logic circuitry that responds to and processes the basic instructions that drives the piano teaching server 300, according to one embodiment.

The piano teaching application 308 may be a computer program designed to perform a group of coordinated functions, tasks, and/or activities for the benefit of the user 122. The piano teaching application 308 may be calibrated with the elongated underpin(s) 204 of the piano teaching apparatus 102 to enable the user 122 to select the compilation 114 and play the musical note 116 to help learn playing the piano 106, according to one embodiment.

The sensor data 310 may be a set of values of qualitative and/or quantitative variables. The sensor data 310 may include distinct pieces of information of the movement (e.g., expansion and/or contraction) and corresponding duration of each of the elongated underpins 204 associated with the particular key 120 of the piano 106 when playing the compilation 114 using the piano teaching apparatus 102, according to one embodiment.

The captured audio data 312 may be the distinct pieces of auditory information acquired by the microphone 124 of the data processing device 110 while the user 122 plays a compilation 114 on the piano 106, according to one embodiment.

The analytical data 314 may be a systematic and logical set of information derived from the captured audio data 312 by the piano teaching server 300 using the musical note algorithm 316. The analytical data 314 may include rational data of the user performance 318 while the user 122 plays a compilation 114 on the piano 106 using the piano teaching apparatus 102, according to one embodiment.

The musical note algorithm 316 may be a process and/or set of rules to be followed in calculations and/or other problem-solving operation of determining user performance 318 based on the analytical data 314 of the piano teaching application 308. The processor 306 of the piano teaching server 300 may verify if a correct particular key 120 of the set of keys 104 is played by the user 122 using the musical note algorithm 316, according to one embodiment.

The piano teaching application 308 may determine if the audio (e.g., captured audio data 312) is associated with the musical note 116 using the musical note algorithm 316. The piano teaching application 308 may advance to a next musical note 116 of the compilation 114 on the display when the audio (e.g., captured audio data 312) is associated with the musical note 116, and/or pause the musical note 116 of the compilation 114 on the display when the audio is not associated with the musical note 116, according to one embodiment.

The user performance 318 may be the representation of the user's capability of learning and/or playing the piano 106 using the piano teaching apparatus 102. The network 320 may be a series of points, and/or nodes, interconnected by communication paths for the purpose of transmitting, receiving and exchanging data between the piano teaching server 300 and the data processing device 110, according to one embodiment.

Once initialized, each of the elongated underpin 204 of the piano teaching apparatus 102 may be calibrated with the piano teaching application 308 of the data processing device 110. In circle '1', the piano teaching application 308 of the data processing device 110 may communicate a set of instructions to illuminate the particular light 118 corresponding to a particular key 120 associated with a musical note 116. In circle '2', the particular light 118 corresponding to the particular key 120 associated with a musical note 116 may be illuminated, according to one embodiment.

In circle '3', the elongated underpins 204 associated with the particular key 120 of the piano 106 may mechanically compress and/or expand based on the particular key 120 played by the user 122. In circle '4', the array of laser sensors 208 may capture the sensor data 310 and send to the data processing device 110 based on the particular key 120 played by the user 122. In circle '5', the microphone of the data processing device 110 may capture the audio resonated when the user 122 plays the particular key 120. Further, the data processing device 110 may send the captured audio data 312 to the piano teaching server 300. In circle '6', the piano teaching server 300 may send analytical data 314 of the user 122 playing the piano 106 to display the user performance 318 on the data processing device 110, according to one embodiment.

Figure 4:
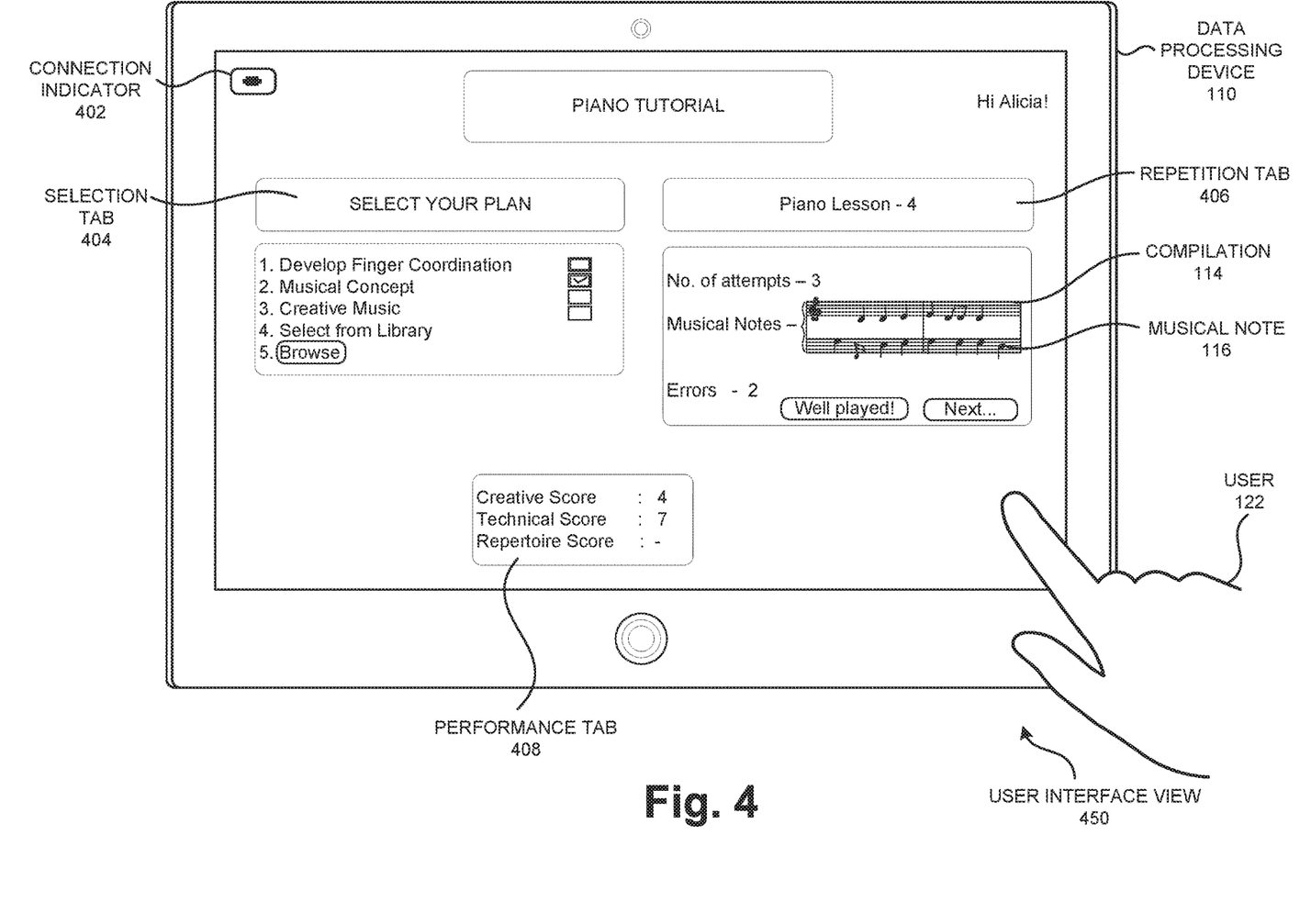
FIG. 4 is a user interface view of the piano teaching apparatus of FIG. 1A-B illustrating the user interacting with the piano teaching apparatus using the data processing device, according to one embodiment.

FIG. 4 is the user interface view 450 of the piano teaching apparatus 102 of FIG. 1A-B illustrating the user 122 interacting with the piano teaching apparatus 102 using the data processing device 110, according to one embodiment. Particularly, FIG. 4 builds on FIGS. 1 to 3, and further adds, a connection indicator 402, a selection tab 404, a repetition tab 406, and a performance tab 408. The connection indicator 402 may show the connection status of the piano teaching apparatus 102 with the data processing device 110. A RED icon of the connection indicator 402 may designate a failed connection while a GREEN icon may designate a successful connection of the piano teaching apparatus 102 with the data processing device 110, according to one embodiment.

The selection tab 404 in the graphical user interface of the piano teaching application 308 may enable the user 122 to elect a particular tutorial plan of piano teaching lessons offered by the piano teaching application 308 of the piano teaching server 300. The repetition tab 406 may enable the user to rehearse the piano lesson a few additional number of times based on user's 122 preferences. The performance tab 408 may display the performance (e.g., user performance 318) of the user 122 based on the analytical data 314 of user's musical learning using the musical note algorithm 316 of the piano teaching server 300, according to one embodiment.

Figure 5:
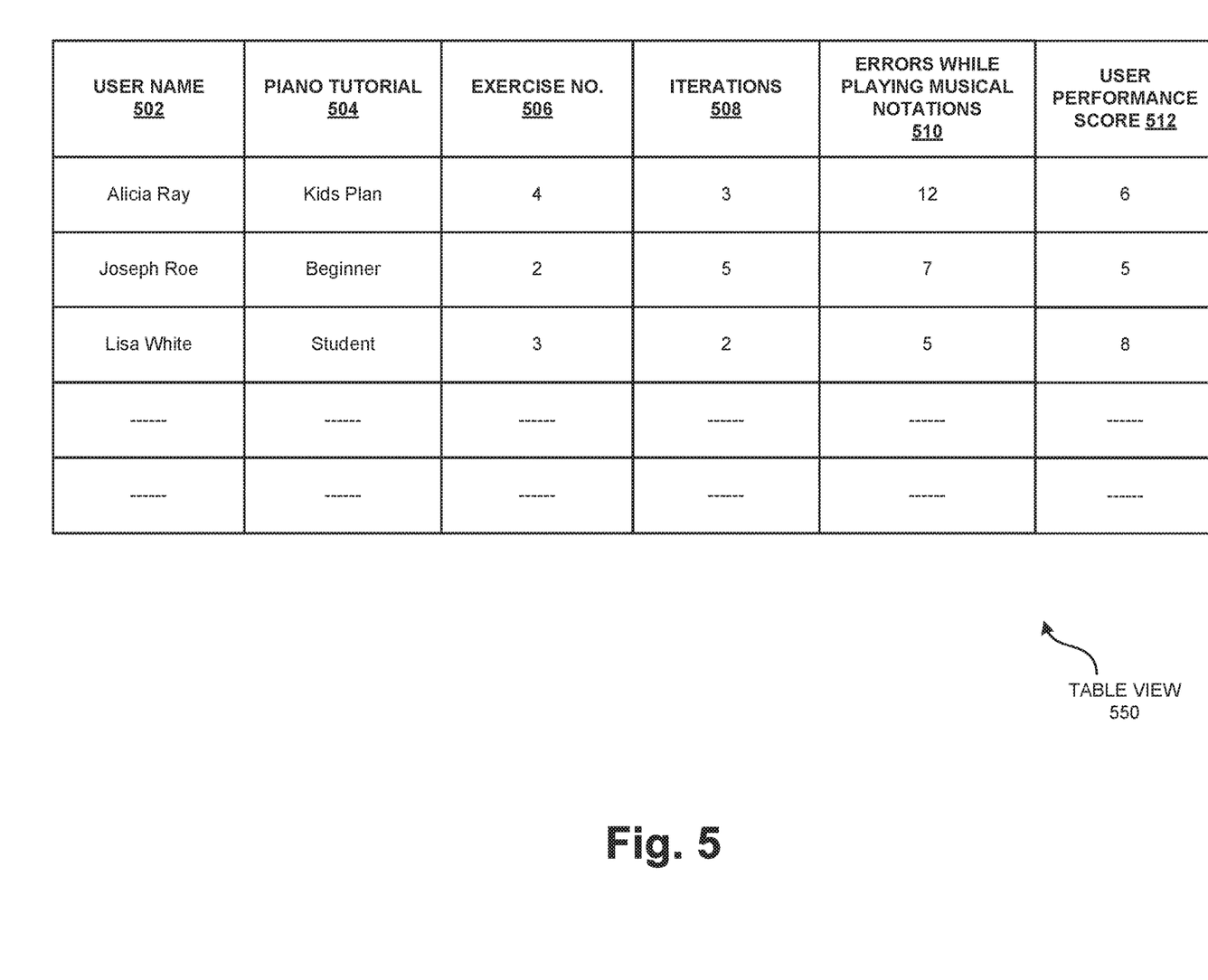
FIG. 5 is a table view illustrating the analytical data stored in the database of piano teaching server based on the user's performance while playing the piano using the piano teaching apparatus of FIG. 1A-B, according to one embodiment.

FIG. 5 is a table view 550 illustrating the analytical data 314 stored in the database 304 of piano teaching server 300 based on user's performance 318 while playing the piano 106 using the piano teaching apparatus 102 of FIG. 1A-B, according to one embodiment. A number of fields are illustrated in the table view 550 including fields associated with the username 502 field, a piano tutorial 504 field, an exercise no. 506 field, an iterations 508 field, an errors while playing musical notations 510 field, and the user performance score 512 field, according to one embodiment.

Particularly, FIG. 5 illustrates an example of three records—Alicia Ray, Joseph Roe, and Lisa White. The record of Alicia Ray illustrates her as taking "Kids Plan" piano tutorial 504, who is in her fourth exercise no. 506, has done 3 iterations 508 of her piano exercise, and has done a total of 12 errors while playing the musical notations 510. The captured audio data 312 may be used to determine the errors while playing the musical notations 510. The musical note algorithm 316 may be applied to determine the user performance score 512, according to one embodiment.

The record of Joseph Roe illustrates him as taking "Beginner" piano tutorial 504, who is in his second exercise no. 506, has done 5 iterations 508 of his piano exercise, and has done a total of 7 errors while playing the musical notations 510. The captured audio data 312 may be used to determine the errors while playing the musical notations 510. The musical note algorithm 316 may be applied to determine the user performance score 512, according to one embodiment.

The record of Lisa White illustrates her as taking "Student" piano tutorial 504, who is in her third exercise no. 506, has done 2 iterations 508 of her piano exercise, and has done a total of 5 errors while playing the musical notations 510. The captured audio data 312 may be used to determine the errors while playing the musical notations 510. The musical note algorithm 316 may be applied to determine the user performance score 512, according to one embodiment.

Figure 6:
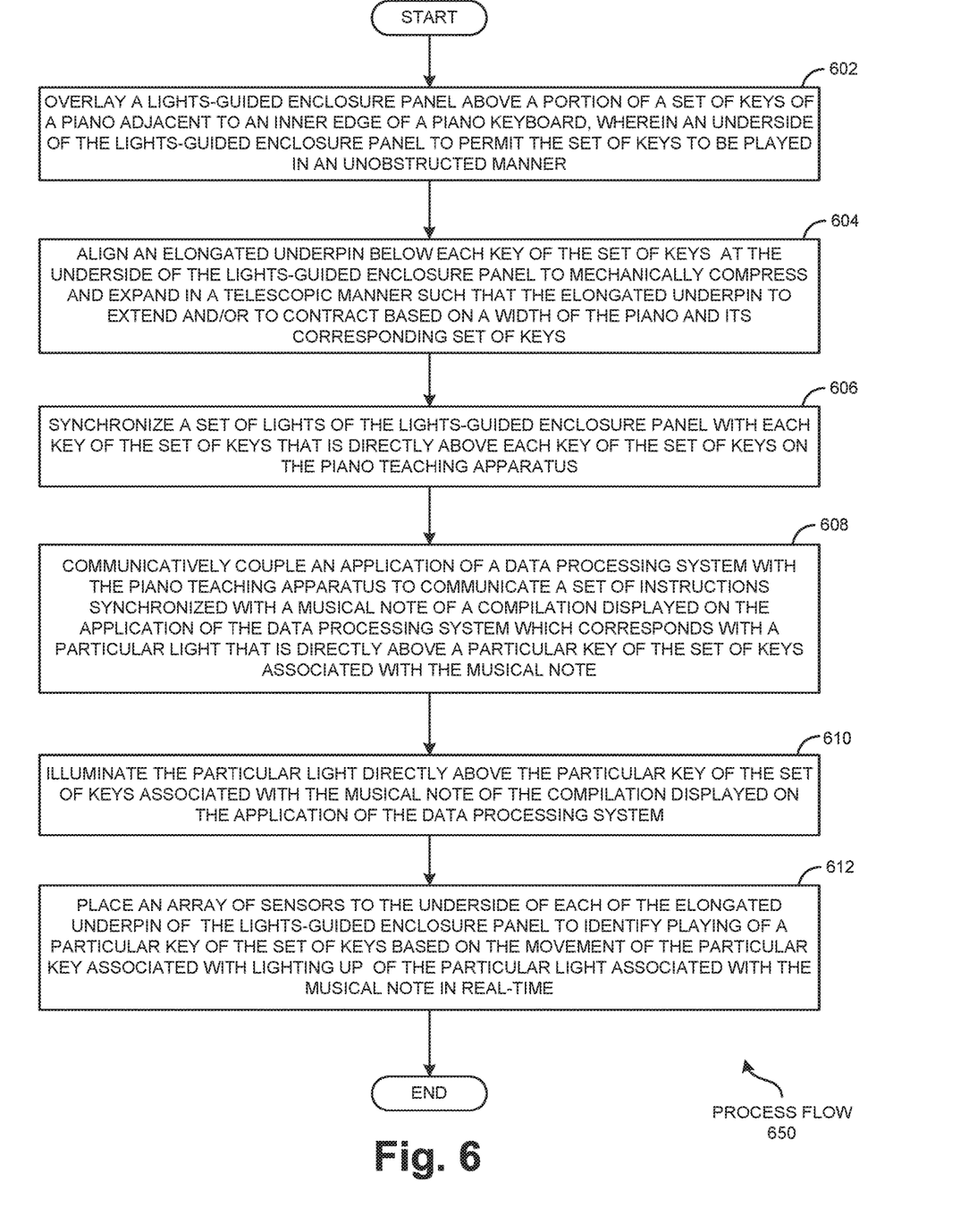
FIG. 6 is a process flow of piano teaching apparatus of FIG. 1A-B, according to one embodiment.

FIG. 6 is a process flow 650 of piano teaching apparatus 102 of FIG. 1, according to one embodiment. In operation 602, a lights-guided enclosure panel 202 may be overlaid above a portion (e.g., inner edge 126) of a set of keys 104 of a piano 106 adjacent to an inner edge 126 of a piano keyboard. An underside of the lights-guided enclosure panel 202 may permit the set of keys 104 to be played in an unobstructed manner.

In operation 604, an elongated underpin 204 may be aligned below each key (e.g., particular key 120) of the set of keys 104 at the underside of the lights-guided enclosure panel 202 to mechanically compress and/or expand in the telescopic manner such that the elongated underpin 204 extends and/or contracts based on a width of the piano 106 and its corresponding set of keys 104.

In operation 606, a set of lights 108 of the lights-guided enclosure panel 202 may be synchronized with each key of the set of keys 104 that is directly above each key (e.g., particular key 120) of the set of keys 104 on the piano teaching apparatus 102.

In operation 608, an application (e.g., piano teaching application 308) of a data processing system (e.g., data processing device 110) may be communicatively coupled with the piano teaching apparatus 102 to communicate a set of instructions 112 synchronized with a musical note 116 of a compilation 114 displayed on the application (e.g., piano teaching application 308) of the data processing system (e.g., data processing device 110) which corresponds with a particular light 118 that is directly above a particular key 120 of the set of keys 104 associated with the musical note 116.

In operation 610, the particular light 118 directly above the particular key 120 of the set of keys 104 associated with the musical note 116 of the compilation 114 displayed on the application (e.g., piano teaching application 308) of the data processing device 110 may be illuminated.

In operation 612, an array of sensors 208 may be placed to the underside of each of the elongated underpin 204 of the lights-guided enclosure panel 202 to identify playing of a particular key 120 of the set of keys 104 based on the movement of the particular key 120 associated with lighting up of the particular light 118 associated with the musical note 116 in real-time.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device 110). Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. A piano teaching apparatus comprising:
an elongated enclosure overlaid atop a portion of a set of keys of a piano adjacent to an inner edge of a piano keyboard such that an underside of the elongated enclosure permits playing of the set of keys;
an elongated underpin below each key of the set of keys of the piano at the underside of the elongated enclosure such that the elongated underpin mechanically compresses and expands in a telescopic manner to at least one of: extend and contract based on a width of the piano and the set of keys thereof;
a set of lights synchronized with the set of keys, with each light of the set of lights aligned directly atop a key of the set of keys;
a display device to display an application of a data processing system communicatively coupled with the piano teaching apparatus that communicates a set of instructions synchronized with a musical note of a compilation displayed on the application via the display device which corresponds with a particular light of the set of lights that is directly above a particular key of the set of keys associated with the musical note, the particular light directly above the particular key of the set of keys associated with the musical note of the compilation displayed being illuminated in accordance with the communication of the set of instructions synchronized with the musical note; and
a sensor of an array of sensors placed at an underside of the elongated underpin below the each key of the set of keys to identify playing of the particular key of the set of keys based on movement of the particular key associated with the illumination of the particular light associated with the musical note in real-time.

2. The piano teaching apparatus of claim 1, wherein the application of the data processing system displayed:
enables a microphone of the data processing system to listen to an audio resonated when a user of the piano plays any key of the set of keys,
determines association of the audio with the musical note,
advances to a next musical note of the compilation displayed when the audio is determined to be associated with the musical note, and
persists with the musical note of the compilation displayed when the audio is determined to be not associated with the musical note.

3. The piano teaching apparatus of claim 1, wherein the application provides a user of the piano with analytics comprising a number of musical notes successfully played on a first attempt while the compilation progresses sequentially.

4. The piano teaching apparatus of claim 1, wherein the set of lights comprises light emitting diodes which display in binary colors in accordance with the application of the data processing system communicating which of the binary colors to illuminate based on which human hand is to be used to play the musical note.

5. The piano teaching apparatus of claim 1, wherein the piano teaching apparatus is wirelessly coupled with the data processing system.

6. The piano teaching apparatus of claim 1, wherein the data processing system is at least one of: a mobile phone and a tablet device.

7. The piano teaching apparatus of claim 1, wherein the elongated enclosure calibrates with the application of the data processing system during initialization thereof to ensure at least one light of the set of lights illuminates corresponding to each musical note associated with at least one key of the set of keys.

8. A system comprising,
a lights-guided piano key electromechanical assembly comprising:
a base enable the lights-guided piano key electromechanical assembly to situate onto a portion of a set of keys of a piano proximate to an inner edge of a piano keyboard, the base comprising:
an array of wedge shaped underpins, each of which mechanically compresses and expands in a telescopic manner during alignment thereof to the piano by a user such that each wedge shaped underpin at least one of: extends and contracts based on a width of the piano and the set of keys thereof, the array of wedge shaped underpins:
allowing placement of the lights-guided piano key electromechanical assembly onto the set of keys of the piano, and
enabling the corresponding set of keys to be played in accordance with the placement;
an array of lights, each of which corresponds to a key of the set of keys of the piano, on the lights-guided piano key electromechanical assembly directly atop the set of keys of the piano, a particular light of the array of lights lighting up when an application of a data processing system communicatively coupled with the lights-guided piano key electromechanical assembly communicates a set of instructions synchronized with a musical note of a compilation displayed on the application of the data processing system which corresponds with the particular light of the array of lights that, in turn, corresponds to a particular key of the set of keys of the piano associated with the musical note; and a set of sensors at the array of wedge shaped underpins, with each sensor of the set of sensors corresponding to a light of the array of lights, to identify playing of the particular key of the set of keys based on movement of the particular key associated with the lighting up of the particular light associated with the musical note in real-time.

9. The system of claim 8:

wherein the application of the data processing system enables a microphone of the data processing system to listen to an audio resonated when h user of the piano plays any key of the set of keys, and wherein the application of the data processing system:
determines association of the audio with the musical note in real-time,
advances to a next musical note of the compilation displayed when the audio is determined to be associated with the musical note, and
persists with the musical note of the compilation displayed when the audio is determined to be not associated with the musical note.

10. The system of claim 8, wherein the application provides the user with analytics comprising a number of musical notes successfully played by the user on a first attempt while the compilation progresses sequentially.

11. The system of claim 8, wherein the array of lights comprises light emitting diodes displaying in binary colors, with the application of the data processing system communicating which of the binary colors to illuminate based on which human hand is to be used to play the musical note.

12. The system of claim 8, wherein the application of the data processing system enables the user to play the musical note interactively therewith to receive a real-time feedback.

13. The system of of claim 8, wherein the system automatically calibrates with the application of the data processing system when it is during initialization thereof to ensure that the array of lights illuminates corresponding to each musical note associated with at least one key of the set of keys.

14. The system of claim 8, enabling the user to play an LED-guided sheet-music.

15. The system of claim 8, wherein a blue illumination of the particular light of the array of lights indicates a left hand note and a red illumination of the particular light of the array of lights indicates a right hand note to play the musical note.

16. A method of a piano teaching apparatus comprising
overlaying a lights-guided enclosure panel above a portion of a set of keys of a piano adjacent to an inner edge of a piano keyboard such that an underside of the lights-guided enclosure panel permits playing of the set of keys;
aligning an elongated underpin below each key of the set of keys at the underside of the lights-guided enclosure panel such that the elongated underpin mechanically compresses and expands in a telescopic manner to at least one of: extend and contract based on a width of the piano and the set of keys thereof;

synchronizing, on the piano teaching apparatus, a set of lights of the lights-guided enclosure panel with the set of keys and aligning each light of the set of lights directly above a key of the set of keys;
communicatively coupling an application of a data processing e piano teaching apparatus to communicate a set of instructions synchronized with a musical note of a compilation displayed on the application which corresponds to a particular light of the set of lights that is directly above a particular key of the set of keys associated with the musical note;
illuminating the particular light directly above the particular key of the set of keys associated with the musical note of the compilation displayed on the application of the data processing system in accordance with the communication of the set of instructions synchronized with the musical note; and
placing a sensor of an array of sensors at an underside of the elongated underpin below the each key of the set of keys to identify playing of the particular key of the set of keys based on movement of the particular key associated with the illumination of the particular light associated with the musical note in real-time.

17. The method of the piano teaching apparatus of claim 16, further comprising:
listening, through a microphone of the data processing system, to an audio resonated when a user of the piano plays any key of the set of keys;
determining association of the audio with the musical note;
advancing to a next musical note of the compilation displayed when the audio is determined to be associated with the musical note; and
pausing the musical note of the compilation displayed when the audio is determined to be not associated with the musical note.

18. The method of the piano teaching apparatus of claim 16, further comprising:
displaying the particular light ire y above the particular key of the set of keys associated with the musical note of the compilation in binary colors in accordance with the application of the data processing system communicating which of the binary colors to illuminate based on which human hand is to be used to play the musical note.

19. The method of the piano teaching apparatus of claim 16, further comprising:
providing a user of the piano with analytics in real-time comprising a number of musical notes successfully played on a first attempt while the compilation progresses sequentially.

20. The method of the piano teaching apparatus of claim 16, further comprising:
calibrating the piano teaching apparatus with the application of the data processing system by initializing the piano teaching apparatus to ensure that at least one light of the set of lights illuminates corresponding to each musical note associated with at least one key of the set of keys.

* * * * *